United States Patent [19]
Hill

[11] Patent Number: 5,221,071
[45] Date of Patent: Jun. 22, 1993

[54] VEHICLE SEAT SUSPENSION WITH IMPROVED COMPRESSION SPRING MOUNTING

[75] Inventor: Kevin E. Hill, Mequon, Wis.

[73] Assignee: Milsco Manufacturing Company, Milwaukee, Wis.

[21] Appl. No.: 792,640

[22] Filed: Nov. 15, 1991

[51] Int. Cl.⁵ ............................................ F16M 13/00
[52] U.S. Cl. .................................. 248/585; 297/345; 267/179; 248/582
[58] Field of Search ............... 248/585, 582, 586, 591, 248/595, 421, 370; 297/264, 345; 267/166, 179

[56] References Cited

U.S. PATENT DOCUMENTS

| | | | |
|---|---|---|---|
| 714,752 | 12/1902 | Shea | 267/166 X |
| 1,960,939 | 5/1934 | Honsen | 248/585 |
| 2,685,324 | 8/1954 | Kramer | 248/585 X |
| 2,871,916 | 2/1959 | Fox | 297/263 |
| 3,053,570 | 9/1962 | Fox | 297/263 |
| 3,285,562 | 11/1966 | Langer | 248/585 X |
| 3,314,672 | 4/1967 | Persson | 248/585 X |
| 3,319,920 | 5/1967 | Freedman et al. | 248/585 |
| 3,547,393 | 12/1970 | Gordin | 248/582 |
| 3,618,214 | 4/1967 | Armstrong | 267/179 X |
| 3,917,209 | 11/1975 | Adams . | |
| 3,921,966 | 11/1975 | Genbauffe | 267/166 |
| 4,333,403 | 6/1982 | Tack et al. | 267/179 X |
| 4,702,454 | 10/1987 | Izumida | 248/585 |
| 4,793,597 | 12/1988 | Smith | 267/179 X |

FOREIGN PATENT DOCUMENTS 14685 1/1981 Fed. Rep. of Germany ...... 267/166

Primary Examiner—Alvin C. Chin-Shue
Assistant Examiner—Korie H. Chan
Attorney, Agent, or Firm—Nilles & Nilles

[57] ABSTRACT

A seat suspension for resiliently mounting an operator's seat on a vehicle for floating movement in fore-to-aft and vertical directions. The seat suspension includes a base part that has lower front and rear pivot axes and a lower spring end seat; and a support part on which the operator's seat can be mounted with the support part having upper front and rear pivot axes and an upper spring end seat. One of the spring seats has a fulcrum and a lateral movement retainer while the other spring seat has an anchor. Front and rear links pivotally interconnect the upper and lower front pivot axes and the upper and lower rear pivot axes, respectively. Compression springs each having an axis and spaced apart upper and lower end portions that are generally transverse to the spring axis are mounted between the base part and the support part. One transverse end portion of each compression spring is mounted in the anchor and secured thereby against movement. The other end portion of each compression spring is supported on the fulcrum and is secured by the retainer only against lateral movement to allow this other end portion to roll back and forth on the fulcrum and shift the angle of the spring axis.

13 Claims, 5 Drawing Sheets

VEHICLE SEAT SUSPENSION WITH IMPROVED COMPRESSION SPRING MOUNTING

BACKGROUND OF THE INVENTION

1. Field of Use

This invention relates to a seat suspension having a compression spring system for resiliently supporting a seat on a vehicle and more specifically to an improved mounting arrangement for the compression springs.

2. Description of the Prior Art

It is known in the prior art to provide a seat suspension having a base part mountable on a vehicle, a seat support part on which the seat is mounted, a parallel link mechanism interconnecting the base and support parts to permit relative vertical movement therebetween, and cylindrical compression spring means mounted between the base part and the seat support part or a part of the parallel linkage. In such known designs, the free ends of the compression spring means are each fully anchored or supported about the entire circumference of their respective free ends by spring support seats usually created by lancing and upsetting a steel plate to form an annular flange that projects into the internal bore of the spring. U.S. Pat. No. 3,917,209, issued Nov. 4, 1975 to Albert John Adams, discloses a typical suspension system of this type showing spring seats fully anchoring both ends of the spring.

The axis of an unstressed compression spring lies in a straight line or if the spring is lightly compressed, the axis may be slightly bowed depending upon the wire gauge of the spring. For maximum spring life it has long been known that the direction of a force vector indicating the force applied when sitting on the seat to stress the compression spring during vertical floating of the seat should be parallel to the spring's straight line axis to maintain the axis as close to straight line as possible. As a practical matter this is not achieved. The ends of the parallel links must follow an arcuate path and the seat support part will shift vertically and, to some minor extent, horizontally fore and aft relative to the fixed base part, thus forcing the axis of the spring to shift and modify its shape during vertical floating of the seat. However, as the ends of the spring are fully anchored, horizontal fore-to-aft shifting of the seat support part relative to the base requires that the spring axis fluctuate and, at some point, modify its straight line axis into a non-straight line axis having an ogee or S curve configuration. Exactly when an S curve will occur depends upon the specific geometry of a given suspension system and preferably it will occur, for example, as the suspension reaches its vertically uppermost position.

Causing the spring axis to so modify fatigues the spring and reduces its life very significantly. Slightly bowing the spring axis does not significantly shorten spring life. The forming of S curves causes a larger number of sharper bends which stress the spring and the usual result is that the spring prematurely catastrophically breaks. Spring breakage has several adverse results. First, breakage can project spring pieces into the surrounding area with injury causing force. Second, spring breakage allows the seat to abruptly bottom out which can cause the operator to lose control of the vehicle. Third, the spring must be replaced, which may be very difficult and expensive when the suspension assembly is welded and riveted together. Frequently the spring cannot be conveniently replaced and then the suspension arrangement must be replaced as a unit at very significant cost which generates customer dissatisfaction based on a belief that he has received a defective product.

To minimize such fluctuation and modification of the spring axis shape, two design principles are usually followed in the prior art. First, it is common practice to make the parallel links as long as space limitations will allow. This is done to permit the compression spring to be made as long as possible so that it will not assume an S shape. Second, the links are orientated to extend more closely to the horizontal rather than the vertical so that the ends of the links connected to the seat support part will follow an arcuate path having a large radius orientated to be substantially vertical and thereby minimize both the amount of fore-to-aft travel and modification of the spring axis shape. This requires the seat support links and springs to be unduly large and heavy, with a high overall profile, all of which increases the cost of manufacture.

Orientating the parallel links more closely to horizontal also leads to certain functional disadvantages. To facilitate the operator's dismounting, the seat should be moved aft, that is, away from the steering wheel a substantial distance in order to provide the operator with a longer fore-to-aft access space to more easily accommodate passage of the leg and thigh as he gets off of the vehicle. Preferably this aft seat movement should occur automatically, in immediate response to removal of the operator's weight as he starts to rise to dismount from the vehicle. With the use of parallel links that are orientated more closely to horizontal than vertical, just the opposite result occurs. As the operator starts to rise, the absence of his weight allows the seat to rise but the ends of the links move primarily vertical and there is very little fore-to-aft travel. This results in the forward edge of the seat moving upward and thus closer to the steering wheel. Therefore in known designs the seat suspension actually can function to reduce the space available to accommodate the operator's leg and thigh during dismounting. The solution to this problem has been to mount the seat suspension on horizontal tracks for selectable fore-to-aft movement. In theory, this allows the operator to always provide space necessary for safe dismounting but in practice there are two major drawbacks to this design. First, the operator must take positive action to actually cause the seat to move aft before dismounting. However, frequently the operator is in too much of a hurry to leave the seat, with the result that he or she does not slide it back which increases the risk of tripping or falling during dismounting. Second, the track mechanism materially increases the complexity of the seat suspension and the cost of manufacture.

What is needed therefore is a seat suspension of simple design with a minimal number of parts that will permit the seat immediately and automatically to travel substantial distances in both fore-to-aft and vertical directions when the operator starts to dismount to minimize the need for an independent horizontal track mechanism, and that will also enable the compression spring axis to automatically shift without modification of its shape during floating, thus allowing its overall axial length to be maintained at a minimum to facilitate the ability to locate the spring directly below a force vector generated by the weight of the operator on the seat.

SUMMARY OF THE INVENTION

In accord with the present invention there is provided a seat suspension for resiliently mounting an operator's seat on a vehicle for floating movement in fore-to-aft and vertical directions. The seat suspension includes a base part that has lower front and rear pivot axes and a lower spring end seat means; and a support part on which the operator's seat can be mounted with the support part having upper front and rear pivot axes and an upper spring end seat means. One of the spring seat means has a fulcrum means and a lateral movement retainer means while the other of the spring seat means has an anchor means. Front and rear link means pivotally interconnect the upper and lower front pivot axes and the upper and lower rear pivot axes, respectively, in order to secure the support part and its upper spring seat in vertically spaced relation to the base part and to allow the lower spring seat to move in fore-and-aft and vertical directions. A compression spring means having an axis and spaced apart upper and lower end portions that are generally transverse to the spring axis, is mounted between the base part and the support part. One of the transverse end portions of the compression spring means is mounted in the anchor means and secured thereby against movement in any fore-to-aft and lateral directions as the support part moves relative to the base part. The other end portion of the compression spring means is supported on the fulcrum means and is secured by the retainer means only against lateral movement to allow the other end portion to roll back and forth on the fulcrum and shift the angle of the spring axis for the purpose of constantly maintaining the axis in an unmodified straight line generally right angle relationship to the transverse other end portion and minimize lateral flexing of the spring over the range of travel of the support part as it repetitively moves in fore-to-aft and vertical directions.

Preferably the fulcrum means will comprise a laterally extending first rod having a top surface and a length that is greater than the outside diameter of the end of the spring which it supports and the retainer means will comprise a laterally extending second rod having a base portion that is mounted piggyback on the top surface of the first rod with the base portion having a lateral extent that is substantially equal to the internal diameter of the compression spring which it supports. Preferably the first rod will have a semicircular cross section having a first radius, and the second rod will also have a semi-circular cross section but of a second radius that is smaller than the first radius.

The base part lower rear pivot axis is located aft of the support part upper pivot axis. The lower spring seat is located between the front and rear pivot axes of the base part and the upper spring seat is located aft of the support part upper rear pivot axis thus placing the axis of the compression spring in position traversing the rear link means. Preferably the base part lower front and rear pivot axes are located aft of the support part upper front and rear pivot axes, respectively, at a distance that will orientate each of the link means at angles relative to horizontal that are 45° or greater when the suspension is at said upper limit of vertical direction movement. The support part of the suspension has a center of mass against which a force vector created by a vehicle operator's weight is applied when the seat suspension is in use and the upper spring end seat is located on the support plate at this center of mass. In addition, the axis of the compression spring means is in vertical alignment with the force vector created by the vehicle operator's weight and passes through the center of mass when the suspension is at a lower limit of vertical travel.

With this design, the seat will automatically move the operator toward the steering wheel when he or she sits down, and will result in primarily vertical movement during the normal range of floating. As one end of the spring is free to rock, modification of the spring axis is kept to a minimum. When the operator starts to dismount, the seat will move aft and away from the steering wheel before actual dismounting occurs. This suspension also permits a compression spring of minimum axial length to be used that will not be unduly stressed repeatedly into premature breakage.

DESCRIPTION OF THE PREFERRED EMBODIMENT

Figure 1:
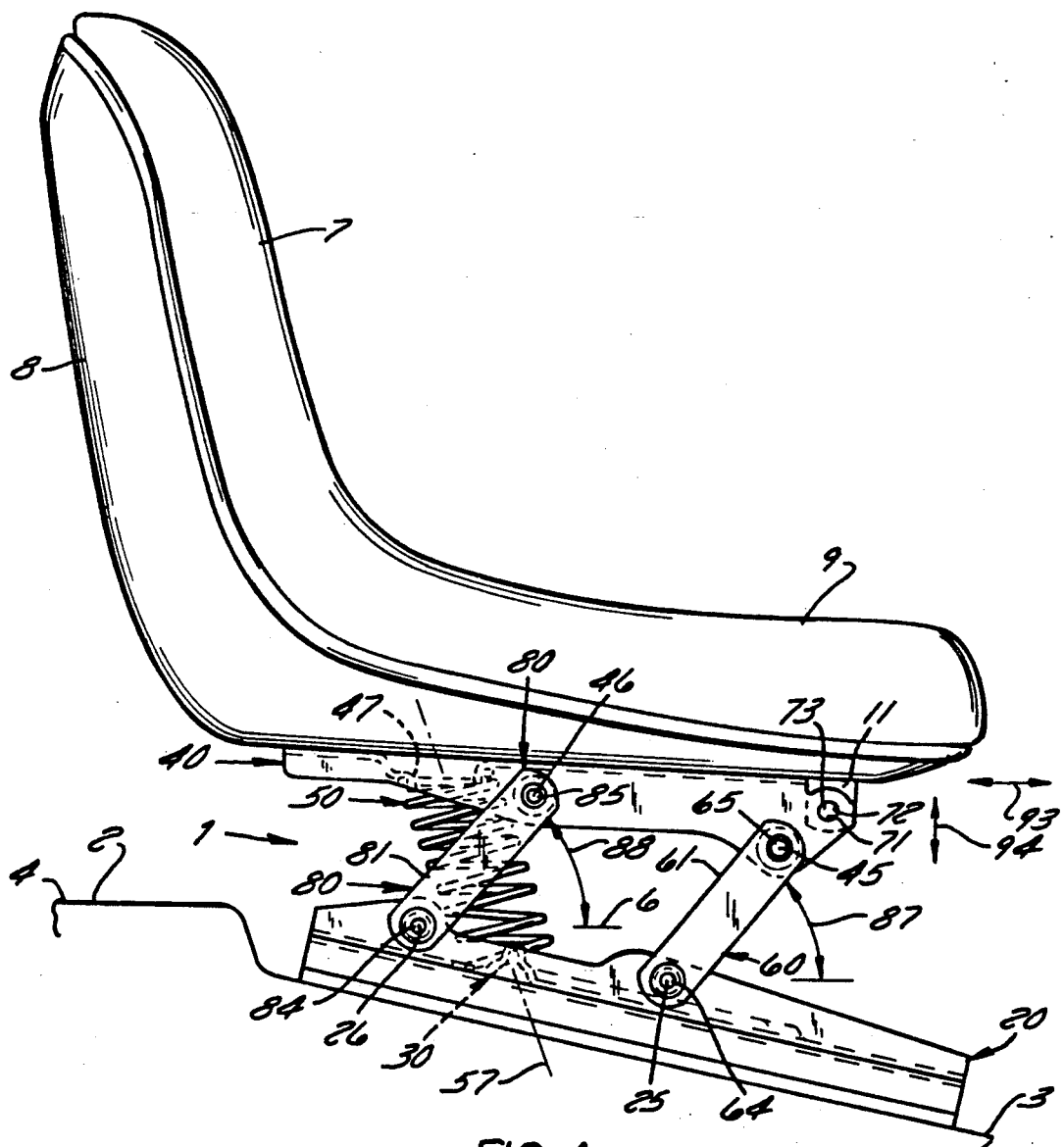
FIG. 1 is a side elevational view of the seat suspension constructed according to the present invention and shows an operator's seat mounted thereon at its upper limit of vertical travel.
Figure 3:
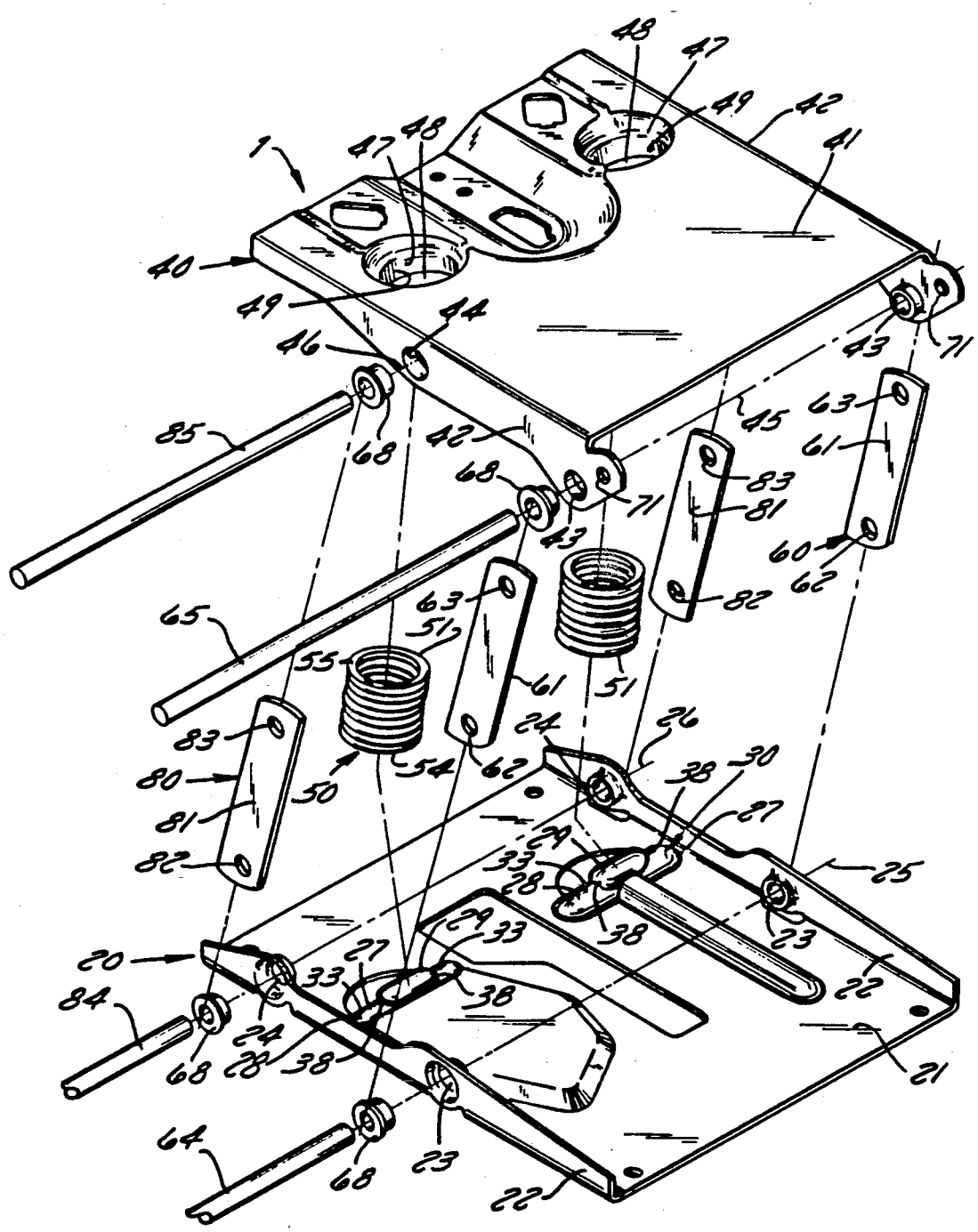
FIG. 3 is an exploded isometric projection view of the seat suspension shown in FIG. 1.
Figure 4:
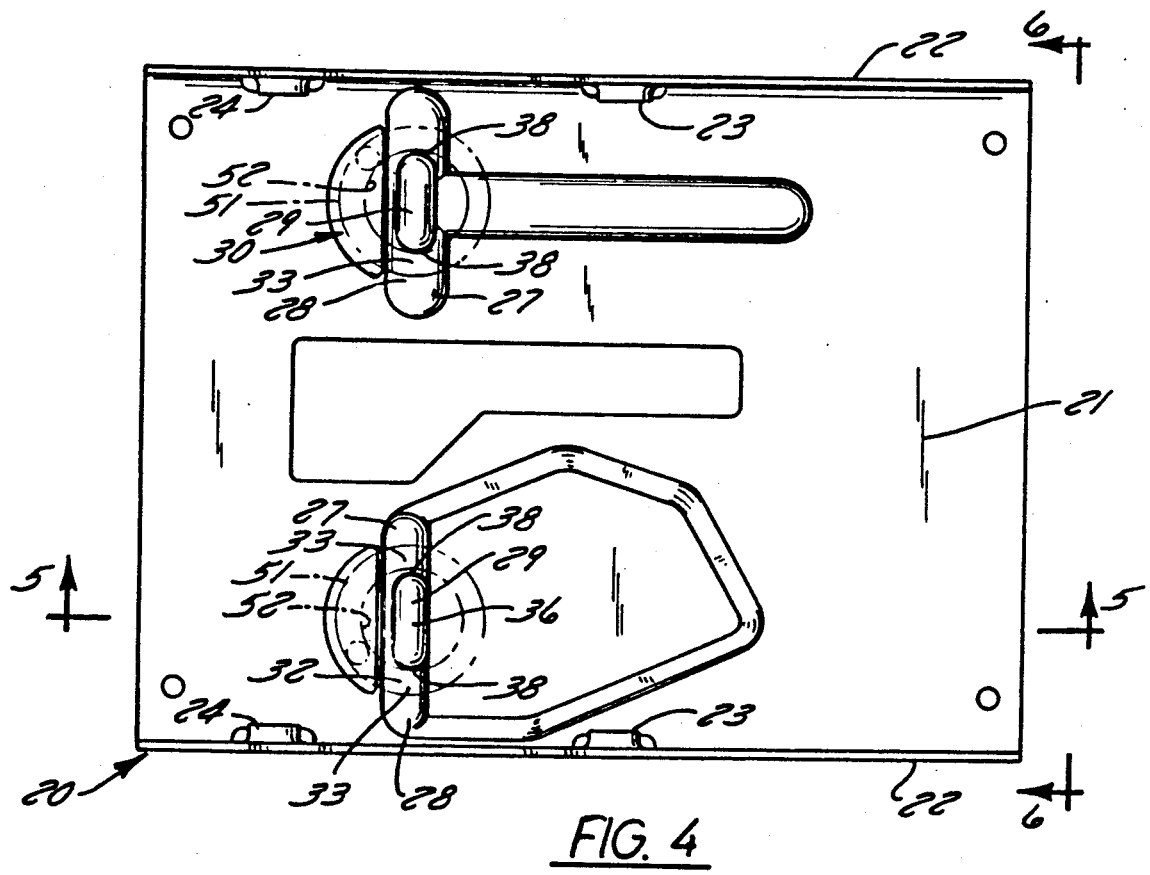
FIG. 4 is a top view of the base part of the seat suspension shown in FIG. 1.
Figure 5:
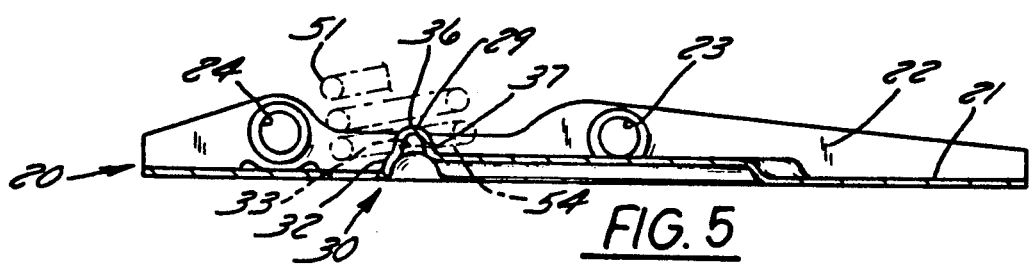
FIG. 5 is a sectional view taken along line 5—5 of FIG. 4.
Figure 6:
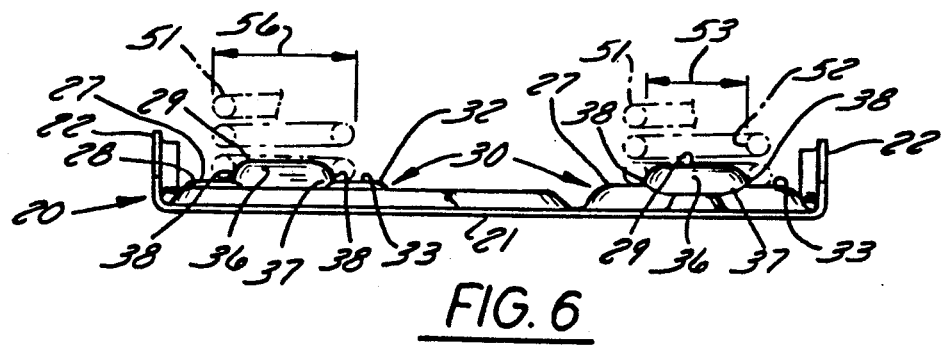
FIG. 6 is an end view taken along line 6—6 of FIG. 4.
Figure 7:
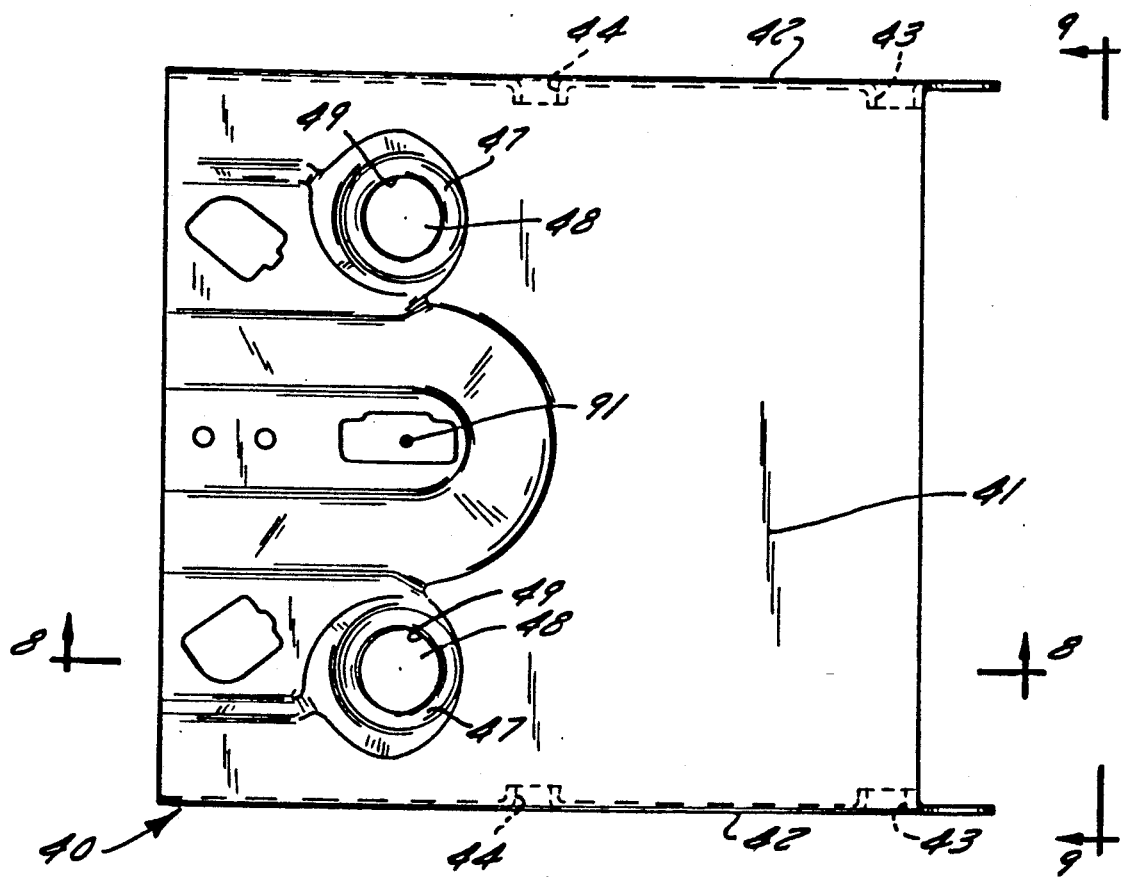
FIG. 7 is a bottom view of the seat support part shown in FIG. 1.
Figure 8:
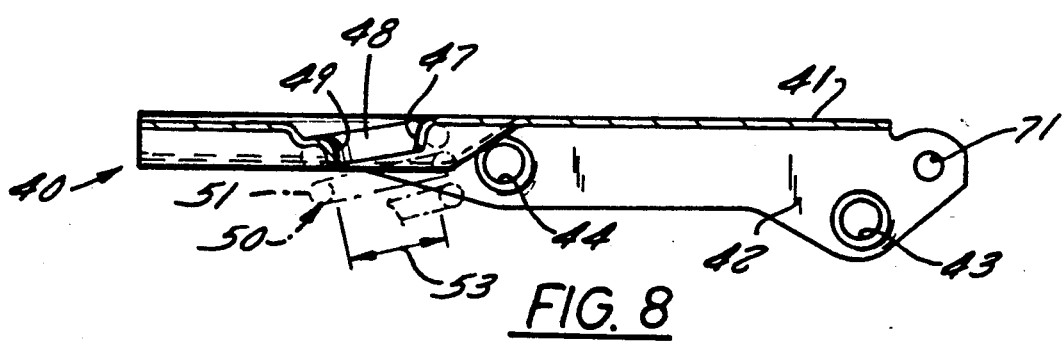
FIG. 8 is a sectional view taken along line 8—8 of FIG. 7.
Figure 9:
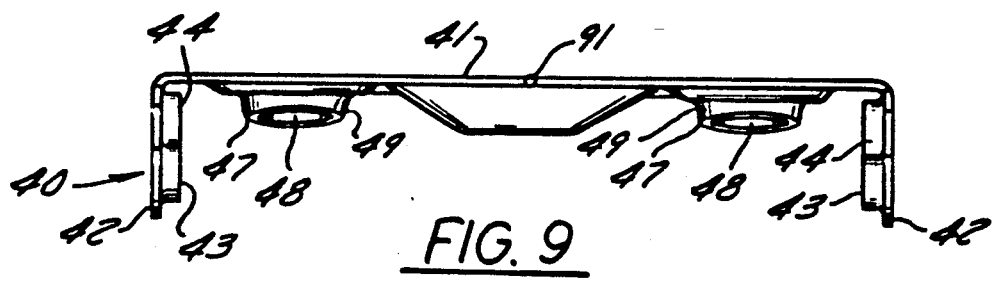
FIG. 9 is an end view taken along line 9—9 of FIG. 7.

Referring to the drawings, FIG. 1 shows the seat suspension 1 on a vehicle 2 having front and rear ends 3 and 4 and a horizontal plane of reference 6. The seat suspension 1 supports a seat 7 that comprises a seat pan 8, a seat cushion 9 and front transversely spaced mounting flanges 11 for pivotally mounting the seat pan 8 on the suspension 1 as will be further explained hereinafter. Referring generally to FIG. 3, the seat suspension 1 includes a base part 20, a seat support part 40 positioned vertically thereabove, front and rear link means 60 and 80 which interconnect the base part 20, and the seat support 40 and a compression spring means 50 including a pair of compression springs 51.

The base part 20 will now be described with reference to FIGS. 3-6. The base part 20 has a base plate 21; spaced apart upstanding parallel side plates 22; transversely spaced pairs of front and rear apertures 23, 24 which define lower front and rear pivot axes 25, 26, and a lower spring end seat means 30. The lower spring end seat means 30 comprises a pair of laterally spaced lower spring end seats 27. As both of the lower spring end seats 27 are identical in construction, only one will be described in detail. The lower spring end seat 27 comprises a fulcrum means 28 and a lateral movement retainer means 29 extending above a base of the spring seat 27 and thus extending generally towards upper spring seat means 47. The fulcrum means 28 comprises a laterally extending first rod member 32 having a top surface 33, forming a spring support surface and a lateral extent that is greater than the outside diameter 56 of the compression spring 51 that is mounted thereon. The retainer means 29 comprises a laterally extending second rod member 36 having a base portion 37 mounted piggyback on the top surface 33 of the first rod member 32 and thus located between the support surface of fulcrum means 28 and upper spring seat means 47. The base portion 37 of the retainer means has a lateral extent that is substantially equal to an internal diameter 53 of the compression spring 51. As best appears in FIG. 5, the first rod member 32 has a semicircular cross section having a first radius providing a rounded top surface 33 that presents a line contact with the transverse end 54 of spring 51. The rod member 32 could have other cross-sectional shapes such as triangular or rectangular. Preferably the second rod member 36 will also include a semicircular cross section that has a second radius smaller than the first radius. The terminal ends 38 (FIG. 6) of the second rod member 36 are rounded or tapered to provide laterally spaced guide surfaces that will center the spring 51 on the retainer means when the seat suspension is assembled as will be more fully described hereinafter. The rod member 36 could also have other cross-sectional shapes.

The support part 40 will now be described with reference to FIGS. 3 and 7-9. The support part 40 on which the operator's seat 7 is mounted has an upper plate 41; spaced apart parallel depending side plates 42; laterally spaced pairs of upper front and rear apertures 43 and 44 constituting upper front and rear pivot axes 45, 46 and an upper spring end seat means 47. The upper spring end seat means 47 comprise a pair of laterally spaced apertures 48 formed by lancing the upper plate 41 and upsetting the peripheral edge to form an annular flange 49 dimensioned to fit securely within the internal diameter 53 (FIG. 8) of the compression spring 51 to constitute an anchor means for securing the spring means 50 against any movement that is generally horizontal in fore-to-aft and lateral directions.

Figure 2:
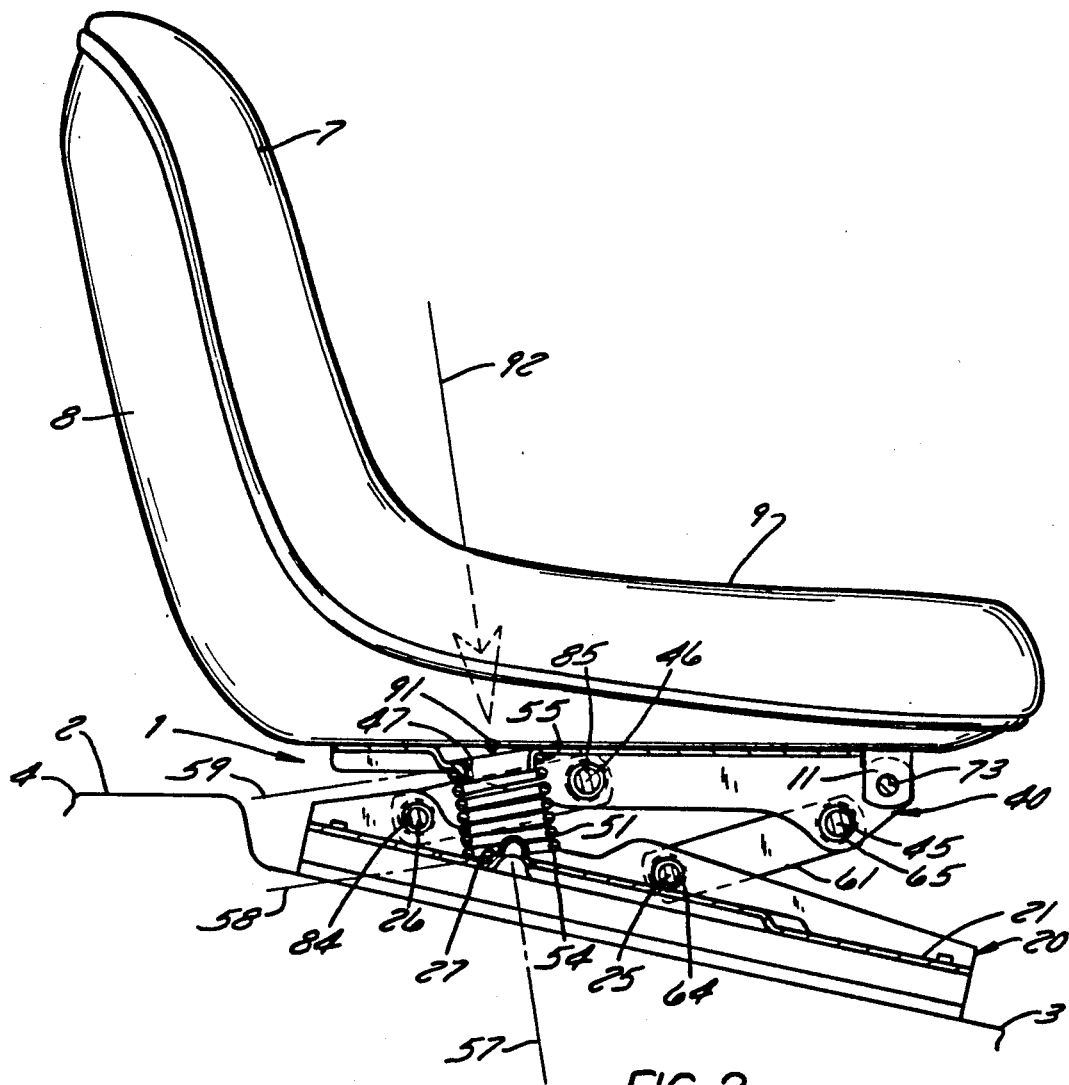
FIG. 2 is a side elevational view of the seat suspension shown in FIG. 1 showing the suspension in its lower limit of vertical travel.

The compression spring means 50 will now be more fully described with reference to FIGS. 2-6 and 8. The compression spring means 50 comprises a pair of laterally spaced helical compression springs 51, although a single spring could be used if desired. The springs 51 are identical and only one will be described. The compression spring 51 has a central bore 52, an internal diameter 53, and an outside diameter 56. In addition, the compression spring 51 has an axis 57 (FIGS. 1 and 2) and spaced apart lower and upper terminal end portions 54, 55 that lie in planes 58, 59 disposed generally transverse to the spring axis 57 when the seat suspension is in its lower limit of vertical travel, as shown in FIG. 2.

The front and rear link means 60 and 80 will now be more fully described with reference to FIGS. 1-3. The seat front and rear link means 60, 80 are pivotally interconnected between the base part 20 and the support part 40, as shown in FIG. 3. The front link means 60 comprises a pair of transversely spaced front links 61 each of which has front lower and upper apertures 62 and 63. Similarly the rear link means 80 comprises a pair of transversely spaced rear links 81 each having rear lower and upper apertures 82 and 83. Each front link 61 is pivotally interconnected between base part 20 and the seat support part 40 by front lower and upper pivot shafts 64 and 65. The outer ends of shafts 64 and 65 pass through lower and upper apertures 23, 43 and are secured in the apertures 62 and 63 of front links 61 by welding or any other suitable type of fastening means. Preferably the laterally spaced ends of the lower and upper pivot shafts 64, 65 will be rotatably supported in bushings 68 mounted in the side plate apertures 23 and 43.

The rear links 81 are pivotally interconnected in similar manner between the rear upper and lower pivot apertures 24, 44 by rear upper and lower rear pivot shafts 84 and 85, and secured thereon as by welding or other suitable fastening means. Preferably each end of the rear upper and lower shafts 84 and 85 will be rotatably supported in bushings 68 mounted in apertures 24 and 44.

As previously explained, the seat pan 8 includes mounting flanges 11 and these flanges are laterally spaced to straddle side walls 42. The support part side walls 42 contain apertures 71 located to align with corresponding apertures 72 (FIG. 1) in flanges 11. A pivot shaft 73 (FIG. is secured in the aligned apertures 71 and 72. The seat can be pivoted as a unit about the pivot shaft 73 relative to seat support part 40 to tilt it forwardly to overlie a steering wheel, not shown, so that water will shed off of the seat when it rains.

With reference to FIGS. 1 and 2, it will be noted that the base part lower rear pivot axis 26 is located aft of the support part upper rear pivot axis 46. The lower spring end seat means 30 is located on the base part 20 between the base part front and rear pivot axes 25 and 26. The upper spring end seat means 47 is positioned aft of the support part upper rear pivot axis 46 to thereby locate the axes 57 of the compression springs 51 in transverse crossing relation to the rear links 81. Preferably, as illustrated in FIG. 1, the axis 57 of the springs will bisect the longitudinal centerline of the rear link means 81 at all positions of seat travel. In addition, the base part front and rear pivot axes 25 and 26 are both located aft of their respective support part upper front and rear pivot axes 45, 46 at a distance that will orientate each of the links 61 and 81 at angles 87, 88 relative to horizontal plane 6 that are 45° or greater when the suspension is at its upper limit of vertical direction movement as shown in FIG. 1. With the 45° angular orientation, occupying the seat will cause it to float downward and forward which places the links 61, 81 closer to horizontal and moves the operator closer to the steering wheel, not shown. During vehicle operation, the primary floating movement of the seat will be vertical and fore-to-aft movement will be secondary. When the operator rises to dismount, the springs 51 will cause the links 61, 81 to move to their 45° angle thereby maximizing the aft movement of the seat to give access for dismounting.

The suspension support part 40, seat 7 and the operator have a center of mass 91 shown in FIG. 2 against which a force vector 92, generated by the seat occupant's weight, is applied when the seat suspension is in use. The upper spring end seat means 47 is located on the support plate 41 at the center of mass 91. In addition, the upper spring end seat 47 and the lower spring end seat 27 are orientated so that the axis 57 of each compression spring 51 and force vector 92 all lie in a lateral plane passing through the center of mass 91 when the seat suspension is at its lower limit of vertical travel as shown in FIG. 2.

By allowing the lower end portion 54 of the compression spring 51 to rock or roll back and forth on top surface 33 of the fulcrum means 28 while it is secured by the retainer means 29 against any lateral movement, the angle of the spring axis 57 is allowed to constantly shift or adjust during floating movement of the seat for the purpose of always maintaining it in a generally straight line right angle relation to end portion 54 as represented by plane 58 in FIGS. 1 and 2 and modification of the shape of the axis is avoided. By maintaining the spring axis 57 at a generally right angle relationship to the transverse end portions 54 and 55 of the springs 51 over the range of travel of the support part 40 as it moves in fore-to-aft and vertical directions 93, 94 relative to the base part 20, the lateral flexing of the spring which would occur if its straight line axis were modified is minimized. This prolongs the spring life; permits a shorter axial length spring to be used; permits these shorter axial length springs to be located directly below the force vector 92 created by the vehicle operator's weight to keep the overall vertical height of the seat suspension at an absolute minimum; and allows the seat to move a significant distance in fore-to-aft directions 93 during mounting and dismounting to minimize the need for an independent sliding track assembly. Of course an independent sliding track assembly could be attached to either the base part 20 or the support part 40 if desired.

What is claimed is:

1. A seat suspension for resiliently mounting an operator's seat on a vehicle for floating movement in vertical and fore-to-aft directions comprising:

a base part having lower front and rear pivot axes, and a lower spring end seat means;

a support part on which the operator's seat can be mounted, said support part having upper front and rear pivot axes, and an upper spring end seat means;

either one of said upper or lower spring seat means having a base, a fulcrum means extending from said base generally toward the other one of said upper or lower spring seat means and presenting a spring support surface, and a lateral movement retainer means located between said spring support surface and said other one of said upper and lower spring seat means, and said other one of said upper and lower spring seat means having an anchor means;

front and rear link means pivotally interconnected, respectively, between said upper and lower front pivot axes and said upper and lower rear pivot axes, to said base part and said support part, thereby to secure said support part and upper spring seat means in vertically spaced relation to said base part for movement in said vertical and fore-to-aft directions;

a compression spring means having an axis and spaced apart upper and lower end portions that are each generally transverse to said spring axis;

one of said transverse end portions of said compression spring means mounted in said anchor means and secured thereby against movement in any fore-to-aft and lateral directions as said support part moves in said vertical and fore-to-aft directions; and the other of said end portions of said compression spring means supported on said spring support surface of said fulcrum means and secured by said retainer means against lateral movement to allow said other end portion to rock fore-to-aft on said fulcrum means and shift the angle of said spring axis for the purpose of constantly maintaining said spring axis in a generally straight line right angle relationship to said other end portion associated therewith and to minimize lateral flexing of said spring means over the range of travel of said support part as said support part moves in said vertical and fore-to-aft directions.

2. The seat suspension according to claim 1 wherein said fulcrum means is on said lower spring end seat means and said anchor means is on said upper spring end seat means.

3. The seat suspension according to claim 1 wherein:
said base part lower rear pivot axis is located aft of said support part upper rear pivot axis;
said lower spring end seat means is located between said base part front and rear pivot axes; and
said upper spring end seat means is located aft of said support part upper rear pivot axis to locate said spring means axis in crossing relation to said rear link means.

4. The seat suspension according to claim 3 wherein said spring means axis bisects a longitudinal centerline of said rear link means.

5. The seat suspension according to claim 3 wherein:
said suspension has upper and lower limits of vertical direction movement; and
said base part lower front and rear pivot axes are located aft of said support part upper front and rear pivot axes at a distance that will orientate each of said link means at angles relative to horizontal that are 45° or greater when said suspension is at said upper limit of vertical direction movement.

6. The seat suspension according to claim 1 wherein:
said suspension support part has a center of mass against which a force vector created by a vehicle operator's weight would be applied when the seat suspension is in use; and
said upper spring end seat means is located on said support part at said center of mass.

7. The seat suspension according to claim 6 wherein said axis of said compression spring means is in vertical alignment with said force vector and passes through said center of mass when said suspension is at a lower limit of vertical travel.

8. A seat suspension for resiliently mounting an operator's seat on a vehicle for floating movement in vertical and fore-to-aft directions comprising:

a base part having lower front and rear pivot axes, and a lower spring end seat means;

a support part on which the operator's seat can be mounted, aid support part having upper front and rear pivot axes, and an upper spring end seat means;

one of said spring seat means having a fulcrum means and a lateral movement retainer means, and the other of said spring seat means having an anchor means;

front and rear link means pivotally interconnected, respectively, between said upper and lower front pivot axes and said upper and lower rear pivot axes, to said base part and said support part, thereby to secure said support part and upper spring seat means in vertically spaced relation to said base part for movement in said vertical and fore-to-aft directions;

a compression spring means having an axis and spaced apart upper and lower end portions that are each generally transverse to said spring axis;

one of said transverse end portions of said compression spring means mounted in said anchor means and secured thereby against movement in any fore-to-aft and lateral directions as said support part moves in said vertical and fore-to-aft directions; and the other of said end portions of said compression spring means supported on said fulcrum means and secured by said retainer means against lateral movement to allow said other end portion to rock fore-to-aft on said fulcrum means and shift the angle of said spring axis for the purpose of constantly maintaining said spring axis in a generally straight line right angle relationship to said other end portion associated therewith and to minimize lateral flexing of said spring means over the range of travel of said support part as said support part moves in said vertical and fore-to-aft directions;
wherein
said compression spring means comprises a helical compression spring having a central bore, an internal diameter and an outside diameter;
said fulcrum means comprises a laterally extending first rod having a top surface and a lateral extent that is greater than said outside diameter of said spring; and
said retainer means comprises a laterally extending second rod having a base portion mounted piggyback on said top surface of said first rod, said base portion having a lateral extent that is substantially equal to said internal diameter of said compression spring.

9. The seat suspension according to claim 8 wherein:
said first rod includes a semicircular cross section having a first radius so that said top surface is rounded to present a line contact with said transverse end portion of the compression spring; and
said second rod includes, a semicircular cross section having a second radius that is smaller than said first radius, and terminal ends that taper vertically from said base portion toward said spring axis to provide laterally spaced guide surfaces that will center said center bore of said spring end portion over said retainer mans.

10. A seat suspension for resiliently mounting an operator's seat on a vehicle for floating movement in vertical and fore-to-aft directions comprising:
a base part having a lower spring end seat;
a support part on which the operator's seat can be mounted, and which is operatively connected to said base part, said support part having upper spring end seat and being movable in vertical and fore-to-aft directions with respect to said base part; either one of said upper or lower spring seats having a base, a fulcrum extending from said base generally towards the other of one said upper or lower spring seats and presenting a spring support surface, and a lateral movement retainer located between said spring support surface and said other one of said upper and lower spring seats, and said other one of said upper and lower spring seats having an anchor;
a compression spring means having an axis and spaced apart upper and lower end portions that are each generally transverse to said spring axis;
one of said transverse end portions of said compression spring means mounted in said anchor means and secured thereby against movement in any fore-to-aft and lateral directions as said support part moves in said vertical and fore-to-aft directions; and
the other of said end portions of said compression spring being supported on said spring support surface of said fulcrum and secured by said lateral movement retainer against lateral movement so as to allow said other end portion to rock fore-to-aft on said fulcrum and to shift the angle of said spring axis for the purpose of constantly maintaining said spring axis in a generally straight line right angle relationship to said other end portion associated therewith and to minimize lateral flexing of said spring over the range of travel of said support part as said support part moves in said vertical and fore-to-aft directions.

11. The seat suspension according to claim 10 wherein
said compression spring comprises a helical compression spring having a central bore, an internal diameter and an outside diameter;
said fulcrum comprises a laterally extending first rod having a top surface and a lateral extent that is greater than said outside diameter of said spring; and
said retainer comprises a laterally extending second rod having a base portion mounted piggyback on said top surface of said first rod, said base portion having a lateral extend that is substantially equal to said internal diameter of said compression spring.

12. A seat suspension for resiliently mounting an operator's seat on a vehicle for floating movement in vertical and fore-to-aft directions comprising:
a base part having lower front and rear pivot axes, and a lower spring end seat;
a support part on which the operator's seat can be mounted, said support part having upper front and rear pivot axes, and an upper spring end seat;
one of said spring seats having a fulcrum and a lateral movement retainer, and the other of said spring seats having an anchor;
front and rear links pivotally interconnected, respectively, between said upper and lower front pivot axes and said upper and lower rear pivot axes, to said base part and said support part, thereby to secure said support part and upper spring seat in vertically spaced relation to said base part for movement in said vertical and fore-to-aft directions;
a compression spring having an axis and spaced apart upper and lower end portions that are each generally transverse to said spring axis; wherein
one of said transverse end portions of said compression spring is mounted in said anchor and secured thereby against movement in any fore-to-aft and lateral directions as said support part moves in said vertical and fore-to-aft directions;
the other of said end portions of said compression spring is supported on said fulcrum and secured by said retainer against lateral movement to allow said other end portion to rock fore-to-aft on said fulcrum and to shift the angle of said spring axis;
said base part lower rear pivot axis is located aft of said support part upper rear pivot axis;
said lower spring end seat is located between said base part front and rear pivot axes; and
said upper spring seat and seat is located aft of said support part upper pivot rear axis to locate said spring means axis in crossing relation to said rear link.

13. The seat suspension according to claim 12 wherein
said compression spring comprises a helical compression spring having a central bore, an internal diameter and an outside diameter;
said fulcrum comprises a laterally extending first rod having a top surface and a lateral extent that is greater than said outside diameter of said spring; and
said retainer comprises a laterally extending second rod having a base portion mounted piggyback on said top surface of said first rod, said base portion having a lateral extend that is substantially equal to said internal diameter of said compression spring.

* * * * *